(12) United States Patent
Yuan et al.

(10) Patent No.: US 9,240,849 B2
(45) Date of Patent: Jan. 19, 2016

(54) APPARATUS AND METHOD FOR DETECTING FAULTY ANTENNAS

(75) Inventors: Fei Yuan, Beijing (CN); Tingting Fu, Beijing (CN); Wenwen Sun, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 104 days.

(21) Appl. No.: 14/003,262

(22) PCT Filed: Mar. 10, 2011

(86) PCT No.: PCT/CN2011/000377
§ 371 (c)(1),
(2), (4) Date: Sep. 5, 2013

(87) PCT Pub. No.: WO2012/119269
PCT Pub. Date: Sep. 13, 2012

(65) Prior Publication Data
US 2013/0344831 A1    Dec. 26, 2013

(51) Int. Cl.
*H04B 17/00*       (2015.01)
*H04W 24/04*       (2009.01)
(Continued)

(52) U.S. Cl.
CPC .......... *H04B 17/0057* (2013.01); *H04B 17/102* (2015.01); *H04B 17/17* (2015.01); *H04B 17/318* (2015.01); *H04W 24/04* (2013.01); *H04W 88/08* (2013.01)

(58) Field of Classification Search
CPC .......... H04B 17/0022; H04B 17/0032; H04B 17/0057; H04B 17/00; H04W 24/04; H04W 88/08
USPC ............... 455/226.2, 226.1, 226.3, 230–231, 455/9–10, 63.1, 67.13, 101, 103, 114.2, 455/115.3, 132–135; 375/148, 144, 777
See application file for complete search history.

(56) References Cited

U.S. PATENT DOCUMENTS 5,937,005 A *  8/1999  Obuchi et al. ................. 375/224
6,226,496 B1  5/2001  Yajima
(Continued)

FOREIGN PATENT DOCUMENTS

CN     1913402 A       2/2007
CN     101835188 A4    9/2010
WO     2008073010 A1   6/2008

OTHER PUBLICATIONS

Extended European Search Report dated Jul. 30, 2014, issued in European Patent Application No. 11860679.7, 6 pages.
(Continued)

*Primary Examiner* — Pablo Tran
(74) *Attorney, Agent, or Firm* — Patent Portfolio Builders, PLLC

(57) ABSTRACT

The present invention discloses an apparatus for detecting a faulty antenna among a plurality of antennas contained in a communication device (200), comprising: a measurer (210) adapted to measure signal strengths of signals obtained from the plurality of antennas each; a calculator (220) adapted to calculate differences between each two of the measured signal strengths; a first comparator (230) adapted to compare each of the calculated differences with a first predetermined threshold value; and a first decider (240) adapted to decide, among the plurality of antennas, an antenna to be faulty on the basis of a respective result of the comparison. The present invention provides an efficient and direct way to detect antennas that are not performing according to expectations, without use of extra external or dedicated detection devices, which reduces hardware and software cost. Further, the detection performed according to the present invention only takes advantage of the measured data of signal strengths, and neither extra transmit power nor time slot is needed for the detection. Also, statistical data of antennas for a long term can be obtained according to the present invention.

20 Claims, 5 Drawing Sheets

(51) Int. Cl.
  *H04B 17/10* (2015.01)
  *H04B 17/17* (2015.01)
  *H04B 17/318* (2015.01)
  *H04W 88/08* (2009.01)

(56) References Cited

U.S. PATENT DOCUMENTS 6,266,528 B1 * 7/2001 Farzaneh ................. 455/423
8,548,029 B2 * 10/2013 Willgert .................. 375/148
2003/0210750 A1 * 11/2003 Onggosanusi et al. ...... 375/295
2005/0245222 A1 * 11/2005 Lehnert et al. ............ 455/226.1
2008/0261535 A1 10/2008 Weil et al.

OTHER PUBLICATIONS

Notification of Transmittal of International Preliminary Report on Patentability, in corresponding International Application No. PCT/CN2011/000377, dated Aug. 8, 2013, 14 pages.

* cited by examiner

|              | RX0 | RX1 | RX2 | RX3 | RX4 | RX5 | RX6 | RX7 |
|--------------|-----|-----|-----|-----|-----|-----|-----|-----|
| RX value (dB) | -76 | -75 | -74 | -83 | -77 | -73 | -72 | -71 |

Figure 3

|     | RX0 | RX1 | RX2 | RX3 | RX4 | RX5 | RX6 | RX7 |
|-----|-----|-----|-----|-----|-----|-----|-----|-----|
| RX0 |     | 1   | 2   | 7 | 1   | 3   | 4   | 5   |
| RX1 |     |     | 1   | 8 | 2   | 2   | 3   | 4   |
| RX2 |     |     |     | 9 | 3   | 1   | 2   | 3   |
| RX3 |     |     |     |     | 6   | 10  | 11  | 12  |
| RX4 |     |     |     |     |     | 4   | 5   | 6   |
| RX5 |     |     |     |     |     |     | 1   | 2   |
| RX6 |     |     |     |     |     |     |     | 1   |
| RX7 |     |     |     |     |     |     |     |     |

Figure 4

| | RX0 | RX1 | RX2 | RX3 | RX4 | RX5 | RX6 | RX7 |
|---|---|---|---|---|---|---|---|---|
| RX value (dB) | -76 | -75 | -74 | -81 | -77 | -73 | -72 | -70 |

Figure 5

| | RX0 | RX1 | RX2 | RX3 | RX4 | RX5 | RX6 | RX7 |
|---|---|---|---|---|---|---|---|---|
| RX0 | | 1 | 2 | 5 | 1 | 3 | 4 | 6 |
| RX1 | | | 1 | 6 | 2 | 2 | 3 | 5 |
| RX2 | | | | 7 | 3 | 1 | 2 | 4 |
| RX3 | | | | | 4 | 8 | 9 | 11 |
| RX4 | | | | | | 4 | 5 | 7 |
| RX5 | | | | | | | 1 | 3 |
| RX6 | | | | | | | | 2 |
| RX7 | | | | | | | | |

Figure 6

| Case | First threshold value | Second threshold value | RX3 | RX7 |
|---|---|---|---|---|
| I | 5dB | 5 | - | - |
| II | 5dB | 2 | faulty | faulty |
| III | 4dB | 5 | faulty | - |
| IV | 4dB | 2 | faulty | faulty |

Figure 7

APPARATUS AND METHOD FOR DETECTING FAULTY ANTENNAS

CROSS REFERENCE TO RELATED APPLICATION(S)

This application is a 35 U.S.C. §371 National Phase Entry Application from PCT/CN2011/000377, filed Mar. 10, 2011 the disclosure of which is incorporated herein in its entirety by reference.

TECHNICAL FIELD

The present invention generally relates to the field of wireless communication, and more particularly relates to an apparatus for detecting a faulty antenna among a plurality of antennas contained in a communication device and the corresponding method.

BACKGROUND

In current wireless communication systems, faulty antenna(s) may result in loss of diversity gain and thus reduced coverage, even increase number of drops during call set-up and handovers. Hence, detection of faulty antennas is of great importance.

A conventional faulty antenna detecting system is disclosed in U.S. Pat. No. 6,226,496B1, wherein the system is adapted to detect a standing wave caused by a reflected wave generated at a trouble point of an antenna system, and comprises a distributing means for branching outputs of the reflected wave for detection, a plurality of detectors connected to respective outputs of the distributing means for detecting voltage value of the standing wave, and a control circuit connected to the detectors for receiving output of each detector to judge fault of the antenna system by processing the detection results.

The main drawback of the above-described conventional technique for detecting faulty antenna(s) is that a plurality of external devices are needed, such as the distributing means, the detectors, and the control circuits. Thus, hardware and software cost will be increased, and extra transmit power and time slots are needed for the detection.

SUMMARY

An object of the present invention is to provide an improved apparatus and method of detecting a faulty antenna among a plurality of antennas contained in a communication device, which obviates at least some of the above-mentioned disadvantages.

According to a first aspect of the present invention, there is provided an apparatus for detecting a faulty antenna among a plurality of antennas contained in a communication device. The apparatus comprises a measurer, a calculator, a first comparator, and a first decider. The measurer is adapted to measure signal strengths of signals obtained from the plurality of antennas each. The calculator is adapted to calculate differences between each two of the measured signal strengths. The first comparator is adapted to compare each of the calculated differences with a first predetermined threshold value. The first decider is adapted to decide, among the plurality of antennas, an antenna to be faulty on the basis of a respective result of the comparison.

Optionally, the communication device is a receiver, the plurality of antennas are a plurality of receiving antennas, and the signals are received by the plurality of receiving antennas.

Alternatively, the communication device is a transmitter, the plurality of antennas are a plurality of transmitting antennas, and the signals are transmitted by the plurality of transmitting antennas.

Optionally, the first decider comprises a counter, a second comparator, and a second decider. The counter is adapted to count a number of differences related to each of the measured signal strengths which are greater than the first predetermined threshold value. The second comparator is adapted to compare the number of differences with a second predetermined threshold value. The second decider is adapted to decide, among the plurality of antennas, an antenna related to the number of differences which is greater than the second predetermined threshold value to be faulty.

Optionally, the first predetermined threshold value is determined on the basis of the signal strengths of the signals, resolution and validity required for the detection.

Optionally, the second predetermined threshold value is determined on the basis of resolution and validity required for the detection.

Optionally, the measurer measures the signal strengths of the signals obtained from the plurality of antennas each for every detection period.

Optionally, the calculator comprises a remover, which is adapted to remove variations due to different Rayleigh fading related to respective antennas from the calculated differences.

Optionally, the communication device is applicable to evolved Node B of TDD LTE (Time Division Duplex Long Term Evolution) system.

According to a second aspect of the present invention, there is provided a method of detecting a faulty antenna among a plurality of antennas contained in a communication device. The method comprises measuring signal strengths of signals obtained from the plurality of antennas each, calculating differences between each two of the measured signal strengths, comparing each of the calculated differences with a first predetermined threshold value, and deciding, among the plurality of antennas, an antenna to be faulty on the basis of a respective result of the comparison.

According to a third aspect of the present invention, there is provided a system, comprising a communication device and the above-described apparatus for detecting a faulty antenna among a plurality of antennas contained in the communication device according to the present invention.

According to a fourth aspect of the present invention, there is provided a computer program product, comprising a computer readable medium, having stored thereon computer executable codes, when executed, causing a processor to perform the above-described method according to the present invention.

According to a fifth aspect of the present invention, there is provided a computer readable medium, having stored thereon computer executable codes, when executed, causing a processor to perform the above-described method according to the present invention.

According to a sixth aspect of the present invention, there is provided an apparatus for detecting a faulty antenna among a plurality of antennas contained in a communication device. The apparatus comprises a measurer, a calculator, a comparator, and a decider. The measurer is adapted to measure signal strengths of signals obtained from the plurality of antennas each. The calculator is adapted to calculate differences between an average value of the measured signal strengths and each of the measured signal strengths. The comparator is adapted to compare each of the calculated differences with a first predetermined threshold value. The decider is adapted to decide, among the plurality of antennas, an antenna to be faulty on the basis of a respective result of the comparison.

According to a seventh aspect of the present invention, there is provided a method of detecting a faulty antenna among a plurality of antennas contained in a communication device. The method comprises measuring signal strengths of signals obtained from the plurality of antennas each, calculating differences between an average value of the measured signal strengths and each of the measured signal strengths, comparing each of the calculated differences with a first predetermined threshold value, and deciding, among the plurality of antennas, an antenna to be faulty on the basis of a respective result of the comparison.

Thus, the present invention provides an efficient and direct way to detect faulty antennas by analyzing signal strengths related to respective antennas, without use of extra external or dedicated detection devices, which reduces hardware and software cost.

BRIEF DESCRIPTION OF THE DRAWINGS

The accompanying drawings are included to provide a further understanding of embodiments and are incorporated in and constitute a part of this description. The drawings illustrate embodiments and together. with the description serve to explain principles of embodiments. The elements of the drawings are not necessarily to scale relative to each other. Like reference numerals designate corresponding similar parts. It should be expressly understood that the drawings are included for illustrative purposes and do not in any manner limit the scope of the present invention.

FIG. 3 is a diagram showing a group of signal strength values of respective antennas according to an embodiment of the present invention;

FIG. 4 is a diagram showing comparison results for the signal strength values shown in FIG. 3;

FIG. 5 is a diagram showing a group of signal strength values of respective antennas according to an embodiment of the present invention;

FIG. 6 is a diagram showing comparison results for the signal strength values shown in FIG. 5;

FIG. 7 is a diagram showing results of detection for the signal strength values shown in FIG. 5 in regard to different threshold values;

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Hereinafter, the present invention will be described with respect to antennas applicable to eNodeB (evolved Node B) of TDD LTE (Time Division Duplex Long Term Evolution) system. However, such description is only exemplary, rather than limiting, and the present invention may also apply to other existing communication protocols/standards, such as GSM (Global System for Mobile Communication), GPRS (General Packet Radio Service), CDMA (Code Division Multiple Access), WCDMA (Wideband CDMA), CDMA2000, WiFi (Wireless Fidelity), Bluetooth, UMTS (Universal Mobile Telecommunications System), HSPA (High Speed Packet Access), WiMAX (Worldwide Interoperability for Microwave Access) etc, and communication protocols/standards developed in the future.

The basic concept of the present invention is to monitor differences between signal strengths of signals obtained from a plurality of antennas each contained in a communication device. Normally the differences between the signals strengths should be small and should only be due to different Rayleigh fading. In case a difference is significant or greater than expected, it is a indication that at least one of the antennas may not perform optimally.

Figure 1:
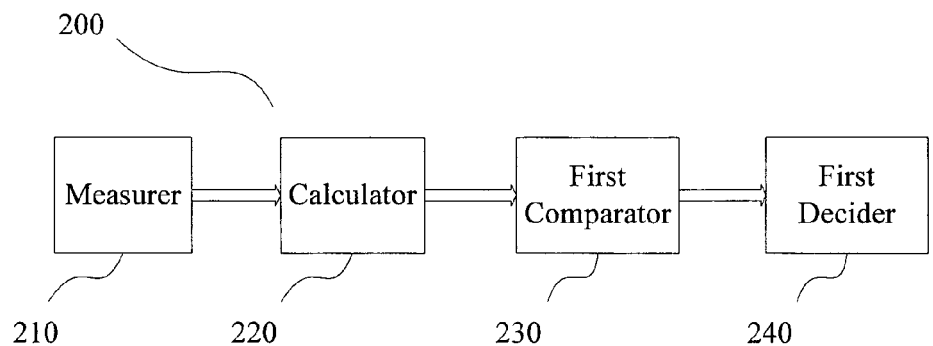
FIG. 1 shows a block diagram illustrating an apparatus for detecting a faulty antenna among a plurality of antennas contained in a communication device according to an embodiment of the present invention.

FIG. 1 shows a block diagram illustrating an apparatus for detecting a faulty antenna among a plurality of antennas contained in a communication device according to an embodiment of the present invention. As shown in FIG. 1, the apparatus 200 comprises a measurer 210 adapted to measure signal strengths of signals obtained from the plurality of antennas each. Various measurement techniques can be employed to implement the measurement of signal strengths. Optionally, the communication device is a receiver provided in eNodeB of a TDD LTE system, the plurality of antennas are a plurality of receiving antennas of the receiver, and the signals are received by the plurality of receiving antennas; alternatively, the communication device is a transmitter provided in eNodeB, the plurality of antennas are a plurality of transmitting antennas of the transmitter, and the signals are transmitted by the plurality of transmitting antennas. For the sake of conciseness and in order to avoid unnecessary iteration, description is made with respect to the receiver and the receiving antennas thereof hereinafter, which can also apply to the transmitter and transmitting antennas thereof.

According to an embodiment of the present invention, the measurer 210 measures the signal strengths of the signals received by the plurality of receiving antennas for every detection period. The length of the detection period can be selected according to actual system conditions and detection requirements. Examples of specific signal strengths that may be utilized in embodiments of the present invention include, but are not limited to Reference Signal Received Power (RSRP) and Reference Signal Received Quality (RSRQ).

Further, the apparatus 200 also comprises a calculator 220 adapted to calculate differences between each two of the measured signal strengths, a first comparator 230 adapted to compare each of the calculated differences with a first predetermined threshold value, and a first decider 240 adapted to decide, among the plurality of antennas, an antenna to be faulty on the basis of a respective result of the comparison. Optionally, the calculator 220 comprises a remover adapted to remove variations due to different Rayleigh fading related to respective antennas from the calculated differences.

As an alternative to the above-described apparatus 200 according to an embodiment of the present invention, the present invention provides an alternative apparatus for detecting a faulty antenna among a plurality of antennas contained in a communication device. The apparatus comprises a measurer adapted to measure signal strengths of signals obtained from the plurality of antennas each, a calculator adapted to calculate differences between an average value of the measured signal strengths and each of the measured signal strengths, a comparator adapted to compare each of the calculated differences with a first predetermined threshold value, and a decider adapted to decide, among the plurality of antennas, an antenna to be faulty on the basis of a respective result of the comparison. The difference between the above-described alternative apparatus and the apparatus 200 is that the alternative apparatus calculates the differences between an average value of the measured signal strengths and each of the measured signal strengths, compares such differences with the first predetermined threshold value, and decides an antenna to be faulty on the basis of the comparison. It is appreciated by those skilled in the art that the optional embodiments described hereinbefore and hereinafter for the apparatus 200 also apply to this alternative apparatus.

In order to exemplify the operations of the above-described components of the apparatus 200, reference is made to FIGS. 3 and 4. FIG. 3 is a diagram showing a group of signal strength values of respective antennas according to an embodiment of the present invention. FIG. 3 shows eight exemplary signal strengths (−76 dB, −75 dB, −74 dB, −83 dB, −77 dB, −73 dB, −72 dB, −71 dB) of signals received by eight receiving antennas of the receiver provided in eNodeB, which are measured by the measurer 210, wherein the number of eight is only exemplary rather than limiting and any number of antennas greater than three is applicable, the signal strengths are expressed in decibel, and the expression of "RX" represents received signal strength. The calculator 220 calculates differences between each two of the above eight measured signal strengths, and the results of the calculation are expressed in absolute values, as shown in FIG. 4. Then, the first comparator 230 compares each of the differences with a first predetermined threshold value.

According to an embodiment of the present invention, the first predetermined threshold value is determined on the basis of the signal strengths, the resolution and validity required for the detection. Optionally, the higher the resolution required for the detection is, the lower the first predetermined threshold value is, and vice versa; the higher the validity required for the detection is, the higher the first predetermined threshold value is, and vice versa. Thus, the first predetermined threshold value is determined on the basis of the signal strengths and detection requirements, decreasing the first predetermined threshold value can provide higher resolution (i.e., more potentially faulty antennas can be identified) and lower validity (i.e., the probability that the identified potentially faulty antennas are really faulty antennas is lower), and vice versa. In this example, a value of 5 dB is selected as the first predetermined threshold value. Accordingly, the first decider 240 decides the antenna having signal strength RX3 to be faulty, since the comparison results show that the differences between RX3 and each of the other signal strengths (i.e, 7 dB, 8 dB, 9 dB, 6 dB, 10 dB, 11 dB, and 12 dB, which are shown in enlarged and bold font) are greater than the first predetermined threshold value, 5 dB.

After finishing the detection, i.e., deciding the potentially faulty antenna, further processing such as testing the antenna to verify the detection and diagnosing faulty node(s) for the faulty antenna can be performed, and such processing does not fall within the scope of the present invention and thus will not be described herein.

Figure 2:
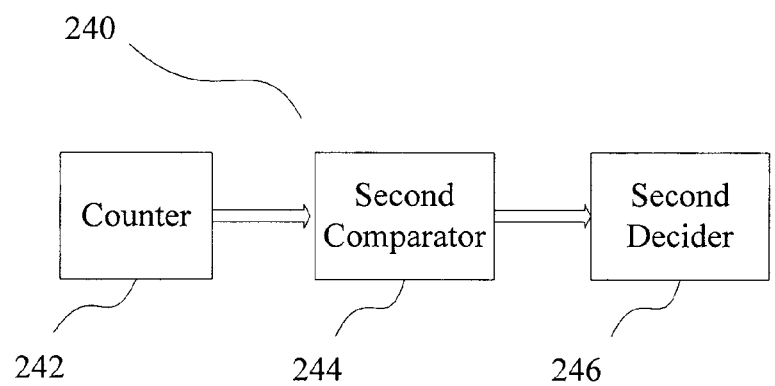
FIG. 2 shows a block diagram illustrating a first decider included in the apparatus according to an embodiment of the present invention.

FIG. 2 shows a block diagram illustrating the first decider 240 included in the apparatus 200 according to an embodiment of the present invention. As shown in FIG. 2, the first decider 240 comprises a counter 242 adapted to count a number of differences related to each of the measured signal strengths which are greater than the first predetermined threshold value, a second comparator 244 adapted to compare the number of differences with a second predetermined threshold value, and a second decider 246 adapted to decide, among the plurality of antennas, an antenna related to the number of differences which is greater than the second predetermined threshold value to be faulty.

In order to exemplify the operations of the above-described components of the first decider 240, reference is made to FIGS. 5, 6, and 7. Similarly with FIG. 3, FIG. 5 also shows a group of eight exemplary signal strengths (−76 dB, −75 dB, −74 dB, −81 dB, −77 dB, −73 dB, −72 dB, −70 dB) of signals received by eight receiving antennas of the receiver provided in eNodeB, which are measured by the measurer 210, wherein still, the number of eight is only exemplary rather than limiting and any number of antennas greater than three is applicable, the signal strengths are expressed in decibel, and the expression of "RX" represents received signal strength. The calculator 220 calculates differences between each two of the above eight measured signal strength, and the results of the calculation are expressed in absolute values, as shown in FIG. 6. Then, the first comparator 230 compares each of the differences with a first predetermined threshold value. Still, the first predetermined threshold value is determined on the basis of the signal strengths, the resolution and validity required for the detection, and in this example, values of 5 dB and 4 dB are respectively selected as the first predetermined threshold value for exemplification. Subsequently, the counter 242 counts a number of differences related to each of the measured signal strengths which are greater than the first predetermined threshold value. Then, the second comparator 244 compares the number of differences with a second predetermined threshold value.

According to an embodiment of the present invention, the second predetermined threshold value is determined on the basis of resolution and validity required for the detection. Optionally and similarly with the first predetermined threshold value, the higher the resolution required for the detection is, the lower the second predetermined threshold value is, and vice versa; the higher the validity required for the detection is, the higher the second predetermined threshold value is, and vice versa. Thus, the second predetermined threshold value is determined on the basis of the detection requirements, decreasing the second predetermined threshold value can provide higher resolution (i.e., more potentially faulty antennas can be identified) and lower validity (i.e., the probability that the identified potentially faulty antennas are really faulty antennas is lower), and vice versa. In this example, values of 5 and 2 are respectively selected as the second predetermined threshold value for exemplification. Accordingly, the second decider 246 decides an antenna related to the number of differences which are greater than the first predetermined threshold value, which is greater than the second predetermined threshold value, to be faulty.

FIG. 7 is a diagram showing results of detection for the signal strength values shown in FIG. 5 in regard to different sets of the first predetermined threshold values (i.e., 5 dB and 4 dB) and the second predetermined threshold values (i.e., 5 and 2). As shown in FIG. 7, in case (I), the first predetermined threshold value is set to 5 dB and the second predetermined threshold value is set to 5, the antenna having signal strength RX3 has 5 differences which are greater than the first predetermined threshold value, i.e., 6 dB, 7 dB, 8 dB, 9 dB, and 11 dB, and the antenna having signal strength RX7 has 3 differences which are greater than the first predetermined threshold value, i.e., 6 dB, 11 dB, and 7 dB. Since the numbers of differences which are greater than the first predetermined threshold value for the antenna having signal strength RX3 and the antenna having signal strength RX7 are both not greater than the second predetermined threshold value (i.e., 5), these two antennas are not decided to be faulty. In case (II), the first predetermined threshold value is still set to 5 dB and the second predetermined threshold value is set to 2; since the numbers of differences which are greater than the first predetermined threshold value for the antenna having signal strength RX3 and the antenna having signal strength RX7 are both greater than the second predetermined threshold value (i.e., 2), these two antennas are both decided to be faulty. Further, in cases III and IV, different detection results are obtained according to different first predetermined threshold values and second predetermined threshold values, as shown in FIG. 7.

Figure 8:
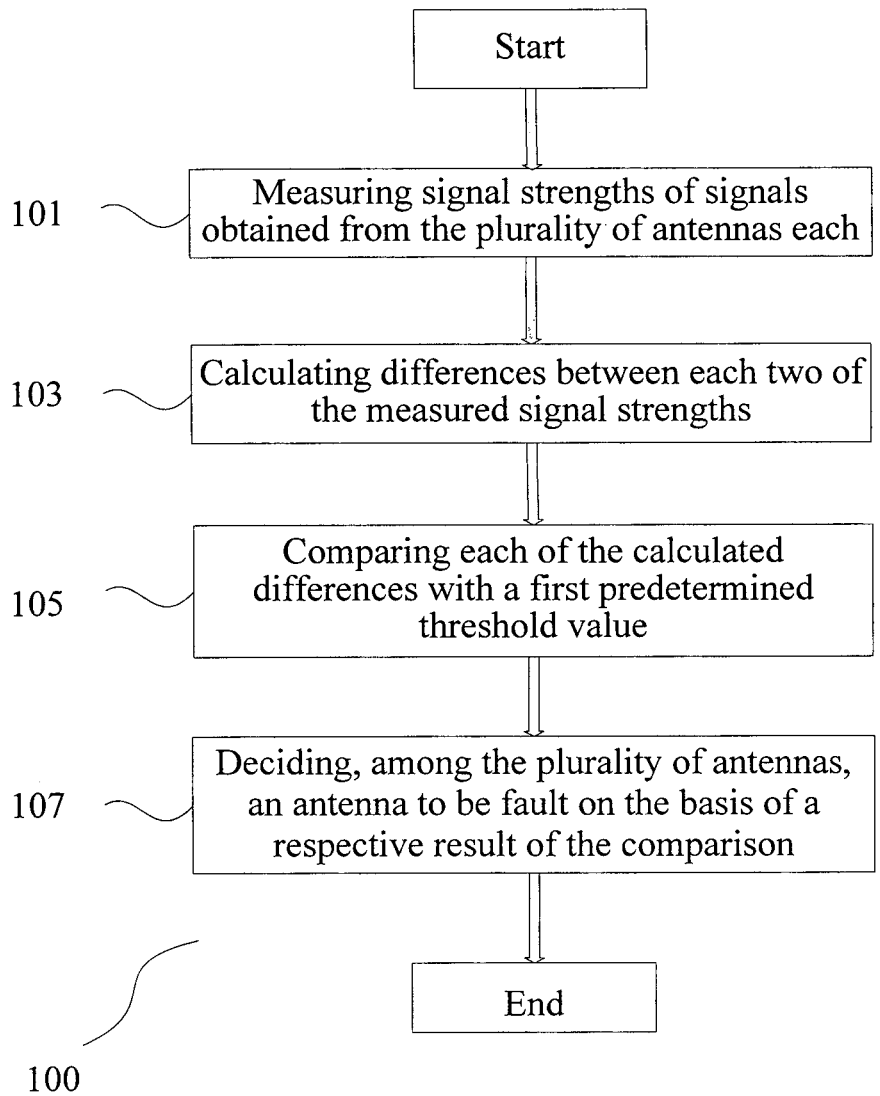
FIG. 8 is a flow chart illustrating a method of detecting a faulty antenna among a plurality of antennas contained in a communication device according to an embodiment of the present invention.

FIG. 8 is a flow chart illustrating a method of detecting a faulty antenna among a plurality of antennas contained in a communication device according to an embodiment of the present invention. Optionally, the method can be performed by the above-described apparatus 200 according to the present invention.

As shown in FIG. 8, the method 100 begins with a step 101, wherein signal strengths of signals obtained from the plurality of antennas each are measured. Optionally, the step 101 can be performed by the above-described measurer 210 of the apparatus 200 according to the present invention. Various measurement techniques can be employed to implement the measurement of signal strengths. Optionally, the communication device is a receiver provided in eNodeB of a TDD LTE system, the plurality of antennas are a plurality of receiving antennas of the receiver, and the signals are received by the plurality of receiving antennas; alternatively, the communication device is a transmitter provided in eNodeB, the plurality of antennas are a plurality of transmitting antennas of the transmitter, and the signals are transmitted by the plurality of transmitting antennas. For the sake of simplicity and in order to avoid unnecessary iteration, description is made with respect to the receiver and the receiving antennas thereof hereinafter, which can also apply to the transmitter and transmitting antennas thereof.

According to an embodiment of the present invention, the step 101 is performed for every detection period. The length of the detection period can be selected according to actual system conditions and detection requirements. Examples of specific signal strengths that may be utilized in embodiments of the present invention include, but are not limited to Reference Signal Received Power (RSRP) and Reference Signal Received Quality (RSRQ).

Then, at step 103, differences between each two of the measured signal strengths are calculated. Optionally, the step 103 can be performed by the above-described calculator 220 of the apparatus 200 according to the present invention. Optionally, the method 100 further comprises removing variations due to different Rayleigh fading related to respective antennas from the calculated differences after the step 103, and this removing step can optionally be performed by the above-described remover of the apparatus 200 according to the present invention.

Subsequently, at step 105, each of the calculated differences is compared with a first predetermined threshold value. Optionally, the step 105 can be performed by the above-described first comparator 230 of the apparatus 200 according to the present invention. Finally, at step 107, an antenna among the plurality of antennas is decided to be faulty on the basis of a respective result of the comparison. Optionally, the step 107 can be performed by the above-described first decider 240 of the apparatus 200 according to the present invention.

As an alternative to the above-described method 100 according to an embodiment of the present invention, the present invention provides an alternative method of detecting a faulty antenna among a plurality of antennas contained in a communication device. The method comprises measuring signal strengths of signals obtained from the plurality of antennas each, calculating differences between an average value of the measured signal strengths and each of the measured signal strengths, comparing each of the calculated differences with a first predetermined threshold value, and deciding, among the plurality of antennas, an antenna to be faulty on the basis of a respective result of the comparison. The difference between the above-described alternative method and the method 100 is that the alternative method calculates the differences between an average value of the measured signal strengths and each of the measured signal strengths, compares such differences with the first predetermined threshold value, and decides an antenna to be faulty on the basis of the comparison. It is appreciated by those skilled in the art that the optional embodiments described hereinbefore and hereinafter for the method 100 also apply to this alternative method.

In order to exemplify the details of the above-described steps of the method 100, reference can be made to FIGS. 3 and 4, and the above description related to FIGS. 3 and 4 also applies to the above-described steps of the method 100, and is thus not iterated in details for the sake of conciseness.

According to an embodiment of the present invention, the first predetermined threshold value is determined on the basis of the signal strengths, the resolution and validity required for the detection. As described above, in the example exemplified with respect to FIGS. 3 and 4, a value of 5 dB is selected as the first predetermined threshold value. Accordingly, at the step 107, it is decided that the antenna having signal strength RX3 is faulty, since the comparison results show that the differences between RX3 and each of the other signal strengths (i.e., 7 dB, 8 dB, 9 dB, 6 dB, 10 dB, 11 dB, and 12 dB) are greater than the first predetermined threshold value, 5 dB.

Figure 9:
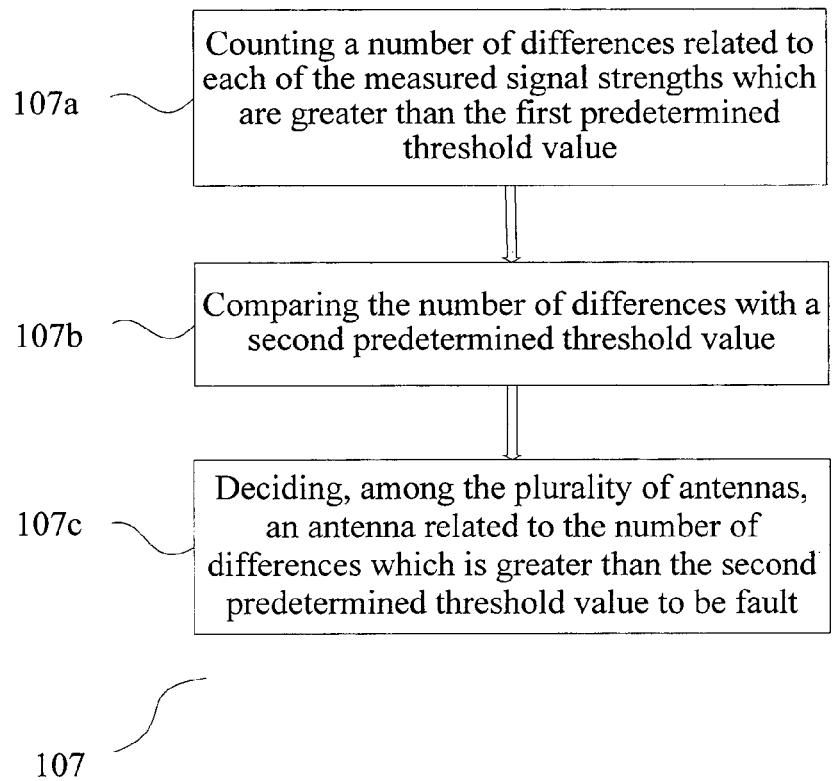
FIG. 9 is a flow chart illustrating a deciding step included in the method according to an embodiment of the present invention.

FIG. 9 is a flow chart illustrating the deciding step 107 included in the method 100 according to an embodiment of the present invention. As shown in FIG. 9, the step 107 comprises substeps 107a, 107b, and 107c. At the substep 107a, a number of differences related to each of the measured signal strengths which are greater than the first predetermined threshold value is counted. Optionally, the substep 107a can be performed by the above-described counter 242 of the apparatus 200 according to the present invention. Then, at the substep 107b, the number of differences is compared with a second predetermined threshold value. Optionally, the substep 107b can be performed by the above-described second comparator 244 of the apparatus 200 according to the present invention. After that, at the substep 107c, an antenna among the plurality of antennas related to the number of differences which is greater than the second predetermined threshold value is decided to be faulty. Optionally, the substep 107c can be performed by the above-described second decider 246 of the apparatus 200 according to the present invention.

In order to exemplify the details of the above-described substeps of the step 107, reference can be made to FIGS. 5, 6 and 7, and the above description related to 5, 6 and 7 also applies to the above-described substeps of the step 107, and is thus not iterated in details for the sake of conciseness.

According to an embodiment of the present invention, still, the first predetermined threshold value is determined on the basis of the signal strengths, the resolution and validity required for the detection. As described above, in the example exemplified with respect to FIGS. 5, 6 and 7, values of 5 dB and 4 dB are respectively selected as the first predetermined threshold value for exemplification. According to an embodiment of the present invention, the second predetermined threshold value is determined on the basis of resolution and validity required for the detection. As described above, in the example exemplified with respect to FIGS. 5, 6 and 7, values of 5 and 2 are respectively selected as the second predetermined threshold value for exemplification. As shown in FIG. 7, in cases I, II, III and IV, different detection results are obtained according to different sets of first predetermined threshold values and second predetermined threshold values.

According to an embodiment of the present invention, there is also provided a system. The system comprises a communication device and the apparatus for detecting a faulty antenna among a plurality of antennas contained in the communication device according to the present invention.

The present invention provides an efficient and direct way to detect faulty antennas by analyzing signal strengths related to respective antennas, without use of extra external or dedicated detection devices, which reduces hardware and software cost. Further, the detection performed according to the present invention only takes advantage of the measured data of signal strengths, and neither extra transmit power nor time slot is needed for the detection. Also, statistical data of signal strengths of antennas for a long term can be obtained according to the present invention.

Embodiments of the present invention may be implemented in hardware, or as software modules running on one or more processors, or in a combination thereof. That is, those skilled in the art will appreciate that special hardware circuits such as Application Specific Integrated Circuits (ASICs) or Digital Signal Processors (DSPs) may be used in practice to implement some or all of the functionality of all components of the apparatus 200 according to an embodiment of the present invention. Some or all of the functionality of the components of the apparatus 200 may alternatively be implemented by a microprocessor of an application server in combination with e.g. a computer program product comprising a computer readable medium having stored thereon computer executable codes, which computer executable codes when executed on the microprocessor causes the application server to perform, for example, the steps of the method 100 according to an embodiment of the present invention. The present invention may also be embodied as one or more device or apparatus programs (e.g. computer programs and computer program products) for carrying out part(s) or all of the steps of the method 100 described herein. Such programs embodying the present invention may be stored on computer readable medium, or could, for example, be in the form of one or more signals. Such signals may be data signals downloadable from an Internet website, or provided on a carrier signal, or in any other forms.

It should be noted that the aforesaid embodiments are exemplary rather than limiting this invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as names.

The invention claimed is:

1. An apparatus for detecting a faulty antenna among a plurality of antennas contained in a communication device, comprising:
    a measurer configured to measure signal strengths of signals obtained from each antenna of the plurality of antennas;
    a calculator configured to calculate differences between each two of the measured signal strengths;
    a first comparator configured to compare each of the calculated differences with a first predetermined threshold value; and
    a first decider configured to decide, among the plurality of antennas, an antenna to be faulty on the basis of a respective result of the comparison;
    wherein the first decider comprises:
    a counter configured to count a number of differences related to each of the measured signal strengths which are greater than the first predetermined threshold value;
    a second comparator configured to compare the number of differences with a second predetermined threshold value; and
    a second decider configured to decide, among the plurality of antennas, an antenna related to the number of differences which is greater than the second predetermined threshold value to be faulty.

2. The apparatus according to claim 1, wherein the communication device is a receiver, the plurality of antennas are a plurality of receiving antennas, and the signals are received by the plurality of receiving antennas.

3. The apparatus according to claim 1, wherein the first predetermined threshold value is determined on the basis of the signal strengths of the signals, resolution and validity required for the detection.

4. The apparatus according to claim 1, wherein the second predetermined threshold value is determined on the basis of resolution and validity required for the detection.

5. The apparatus according to claim 1, wherein the measurer measures the signal strengths of the signals obtained from each antenna of the plurality of antennas for every detection period.

6. The apparatus according to claim 1, wherein the calculator comprises a remover adapted to remove variations due to different Rayleigh fading related to respective antennas from the calculated differences.

7. The apparatus according to claim 1, wherein the communication device is applicable to evolved Node B of TDD LTE system.

8. The apparatus of claim 1, wherein the communication device is a transmitter, the plurality of antennas are a plurality of transmitting antennas, and the signals are transmitted by the plurality of transmitting antennas.

9. The apparatus of claim 1, wherein the first threshold value is greater than the second threshold value, or the first threshold value is equal to the second threshold value, or the first threshold value is less than the second threshold value.

10. A system, comprising a communication device and the apparatus for detecting a faulty antenna among a plurality of antennas contained in the communication device according to claim 1.

11. A method of detecting a faulty antenna among a plurality of antennas contained in a communication device, comprising the steps of:
  measuring signal strengths of signals obtained from each antenna of the plurality of antennas;
  calculating differences between each two of the measured signal strengths;
  comparing each of the calculated differences with a first predetermined threshold value; and
  deciding, among the plurality of antennas, an antenna to be faulty on the basis of a respective result of the comparison;
  wherein the step of deciding, among the plurality of antennas, an antenna to be faulty on the basis of a respective result of the comparison comprises:
  counting a number of differences related to each of the measured signal strengths which are greater than the first predetermined threshold value;
  comparing the number of differences with a second predetermined threshold value; and
  deciding, among the plurality of antennas, an antenna related to the number of differences which is greater than the second predetermined threshold value to be faulty.

12. The method according to claim 11, wherein the communication device is a receiver, the plurality of antennas are a plurality of receiving antennas, and the signals are received by the plurality of receiving antennas.

13. The method according to claim 11, wherein the first predetermined threshold value is determined on the basis of the signal strengths of the signals, resolution and validity required for the detection.

14. The method according to claim 11, wherein the second predetermined threshold value is determined on the basis of resolution and validity required for the detection.

15. The method according to claim 11, wherein the step of measuring the signal strengths of the signals obtained from each antenna of the plurality of antennas is performed for every detection period.

16. The method according to claim 11, further comprising the following step after the step of calculating differences between each two of the measured signal strengths:
  removing variations due to different Rayleigh fading related to respective antennas from the calculated differences.

17. The method according to claim 11, wherein the communication device is applicable to evolved Node B of TDD LTE system.

18. A non-transitory computer program product, comprising a computer readable medium, having stored thereon computer executable codes, when executed, causing a processor to perform the method according to claim 11.

19. A non-transitory computer readable medium, having stored thereon computer executable codes, when executed, causing a processor to perform the method according to claim 11.

20. The method of claim 11, wherein the communication device is a transmitter, the plurality of antennas are a plurality of transmitting antennas, and the signals are transmitted by the plurality of transmitting antennas.

* * * * *